US007825074B2

(12) United States Patent
Schmidt et al.

(10) Patent No.: US 7,825,074 B2
(45) Date of Patent: Nov. 2, 2010

(54) HYDROLYTICALLY AND HYDROTHERMALLY STABLE CONSOLIDATION OR CHANGE IN THE WETTING BEHAVIOR OF GEOLOGICAL FORMATIONS

(75) Inventors: Helmut Schmidt, Saarbruecken-Guedingen (DE); Bernd Reinhard, Merzig-Brotdorf (DE); Klaus Endres, Homburg (DE)

(73) Assignee: EPG (Engineered Nanoproducts Germany) AG, Saarbruecken (DE)

( * ) Notice: Subject to any disclaimer, the term of this patent is extended or adjusted under 35 U.S.C. 154(b) by 347 days.

(21) Appl. No.: 11/721,203

(22) PCT Filed: Jan. 19, 2006

(86) PCT No.: PCT/EP2006/000465

§ 371 (c)(1),
(2), (4) Date: Oct. 12, 2007

(87) PCT Pub. No.: WO2006/077125

PCT Pub. Date: Jul. 27, 2006

(65) Prior Publication Data

US 2009/0233818 A1     Sep. 17, 2009

(30) Foreign Application Priority Data

Jan. 20, 2005   (DE) .................. 10 2005 002 805

(51) Int. Cl.
*C02F 5/08*   (2006.01)
*E21B 33/00*  (2006.01)
*E21B 33/13*  (2006.01)

(52) U.S. Cl. .................. 507/234; 166/285; 166/295

(58) Field of Classification Search ................ 166/295, 166/285; 427/430; 507/234
See application file for complete search history.

(56) References Cited

U.S. PATENT DOCUMENTS

| 3,199,590 | A  |   | 8/1965  | Young           |         |
|-----------|----|---|---------|-----------------|---------|
| 6,287,639 | B1 |   | 9/2001  | Schmidt et al.  |         |
| 6,513,592 | B2 | * | 2/2003  | Espin et al.    | 166/295 |
| 6,579,572 | B2 | * | 6/2003  | Espin et al.    | 427/430.1 |
| 6,656,425 | B1 | * | 12/2003 | Benthien et al. | 422/5   |
| 2001/0019773 | A1 |   | 9/2001 | Akamatsu et al. |        |
| 2003/0031788 | A1 |   | 2/2003 | Espin et al.    |        |
| 2007/0158070 | A1 |   | 7/2007 | Endres et al.   |        |

FOREIGN PATENT DOCUMENTS

| WO | 93/04140    | A | 3/1993 |
| WO | 93/014140   |   | 3/1993 |
| WO | 2005/073278 |   | 8/2005 |

OTHER PUBLICATIONS

Sigma-Aldrich MSDS data sheet of tetraethoxysilane.*
Sigma-Aldrich MSDS datasheet of phenyltriethoxysilane.*
U.S. Appl. No. 11/721,201 (Endres et al.), filed on Jun. 8, 2007 and entitled "Consolidating Agent and Use Thereof for the Production of Hydrolysis-Stable Molded Members and Coatings".
U.S. Appl. No. 11/814,363 (Schmidt et al.), filed on Jul. 20, 2007 and entitled Hydrolytically and Hydrothermally Stable consolidated proppants and Method for the Production thereof.

* cited by examiner

*Primary Examiner*—Timothy J. Kugel
*Assistant Examiner*—Aiqun Li
(74) *Attorney, Agent, or Firm*—Greenblum & Bernstein P.L.C.

(57) ABSTRACT

A process for a consolidation which is hydrolytically stable under hydrothermal conditions and/or for changing the wetting behavior of a porous and/or particulate geological formation. The process comprises introducing into the geological formation a consolidant and curing the introduced consolidant under elevated pressure and elevated temperature. The consolidant comprises a hydrolyzate and/or a precondensate based on silanes and metal compounds.

33 Claims, No Drawings

HYDROLYTICALLY AND HYDROTHERMALLY STABLE CONSOLIDATION OR CHANGE IN THE WETTING BEHAVIOR OF GEOLOGICAL FORMATIONS

The invention relates to a process for a hydrolytically and hydrothermally stable consolidation or for a change in the wetting behavior of porous or particulate geological formations.

Binders are of high significance especially for the binding of compact or granular systems. In the mineral oil industry, particularly the consolidation of granular systems such as geological formations for the stabilization of oil wells and for the consolidation of sand formations in the deposits has become established as an extremely important measure. When such a consolidation does not take place, sand is also transported out and leads to damage on transport equipment (pumps, pipes). An essential element of such consolidation measures is the guarantee of sufficient porosity of the deposits, since the oil flow must not be reduced. Binders are required which are stable under the conditions of a borehole (high pressure at high temperature, water content and aggressive crude oils).

However, it is of considerable importance for efficient use of such binders that the stability under the abovementioned aggressive conditions is maintained for a maximum period, in the course of which the binding stability and the continuing porosity must not be reduced significantly. The systems mentioned in the prior art, virtually all of which are formed from organic polymers, have a very restrictive lifetime in this regard.

Consolidation of geological formations with suitable binders is difficult especially when the consolidated geological formations should not lose porosity to a significant extent in comparison with the unconsolidated geological formations. For example, it is possible with organic polymeric binders to produce porous systems, but it is found that it is barely possible to substantially maintain the original porosity. Although it is possible to produce porous systems with reduced binder use, the property of the organic polymers of swelling or going into solution in the presence of organic solvents makes such consolidations unsuitable for many applications, especially at high temperatures and in the environment of organic liquids.

Although the use of purely inorganic binders, which are obtainable, for example, via the sol-gel process, leads to binding in which an appropriate porosity is maintained, the bound system is very brittle, crumbly and not sufficiently resistant toward mechanical stresses such as shear stresses or high pressure stresses.

Another problem is the hydrolysis stability of the consolidant, since consolidants used according to the prior art are hydrolyzed on contact with water, for example under borehole conditions, so that consolidated geological formations lose their stability obtained through the consolidant again after a certain time.

Moreover, there is generally elevated pressure and elevated temperature in geological formations. It is therefore necessary to carry out the curing necessary for solidification under an elevated pressure and elevated temperature. However, this is only possible to a limited extent, if at all, for many consolidants.

An important special field of consolidation of geological formations is crude oil extraction, in which boreholes are often driven in unconsolidated geological formations. Especially in the case of offshore extraction, these are sand-containing geological formations which have to be consolidated in order to prevent ingress of sand and other rock particles into the borehole with associated damage to the extracting units and contamination of the extracted crude oil. To consolidate such sand deposits, a three-stage process is conventionally employed. First, a synthetic resin binder is injected via a probe, and is then set by injection of an activation system. In a third step, a system is injected to control the permeability and to displace excess resin binder.

There is frequently also an interest in changing the wetting behavior of geological formations. This would make it possible, for example, to increase the yield in oil-bearing geological formations. In the cleaning of toxicologically contaminated soils or oil-contaminated sand formations too, a change in the wetting behavior of these soils can be extremely helpful.

It was an object of the present invention to provide processes for consolidating or for changing the wetting behavior of a geological formation. The consolidation should in particular be hydrolysis-stable and hydro-thermally stable, even under corrosive conditions, so that their function is fulfilled even over a period of years. The porosity of the unbound phase should be retained to a large extent. Moreover, good binding stability should be achieved with sufficient flexibility. Consolidation should also be possible under hydrothermal conditions, i.e. under elevated pressure and elevated temperature. Finally, it should also be possible to carry out a change in the wetting behavior of formations with appropriate adjustment.

The object has been achieved by a process for a hydrolytically and hydrothermally stable consolidation or for a change in the wetting behavior of porous or particulate geological formations, in which (A) a consolidant comprising a hydrolyzate or precondensate of
    (a) at least one organosilane of the general formula (I):

$$R_nSiX_{4-n} \qquad (I)$$

in which the R radicals are the same or different and are each hydrolytically non-removable groups, the X radicals are the same or different and are each hydrolytically removable groups or hydroxyl groups and n is 1, 2 or 3,
    (b) optionally at least one hydrolyzable silane of the general formula (II)

$$SiX_4 \qquad (II)$$

in which the X radicals are each as defined above, and
    (c) at least one metal compound of the general formula (III)

$$MX_a \qquad (III)$$

in which M is a metal of main groups I to VIII or of transition groups II to VIII of the Periodic Table of the Elements including boron, X is as defined in formula (I), where two X groups may be replaced by one oxo group, and a corresponds to the valence of the element,
    where the molar ratio of silicon compounds used to metal compounds used is in the range from 8000:1 to 8:1,
    is infiltrated or injected into the geological formation and
(B) the consolidant is cured under elevated pressure and elevated temperature,
    where the consolidant, in the case that it is used to change the wetting behavior of the formation, also comprises an oleophobic and hydrophobic component. Comprehensive investigations have shown that these consolidants are not decomposed even in autoclaves at high pressure and high temperature even over a prolonged period, and also still form a stable bond under these conditions. In the case of use of a wetting-regulating consolidation variant, it was shown that the wetting behavior established is retained after a hydrothermal treatment in corrosive medium. The consolidation also reduces the porosity only to a slight degree.

The use of hydrolyzable metal compounds of the formula (III) beings two advantages. Surprisingly, in the case of consolidants which comprise these metal compounds, compared to those without this metal compound, particularly good hydrolysis stability and hydrothermal stability of the cured consolidant was determined, even under the extremely aggressive conditions as occur, for example, in reservoirs (corrosive hydrothermal stress). It is thus even possible for consolidations to have long-term stability and be permeable for fluids in reservoirs under corrosive hydrothermal stress.

A further advantage is that consolidants can surprisingly be cured even under elevated pressure.

The consolidant comprises a hydrolyzate or precondensate of
(a) at least one organosilane of the general formula (I)

$$R_nSiX_{4-n} \quad (I)$$

in which the R radicals are the same or different and are each hydrolytically non-removable groups, the X radicals are the same or different and are each hydrolytically removable groups or hydroxyl groups and n is 1, 2 or 3,
(b) optionally at least one hydrolyzable silane of the general formula (II)

$$SiX_4 \quad (II)$$

in which the X radicals are each as defined above, and
(c) at least one metal compound of the general formula (III)

$$MX_a \quad (III)$$

in which M is a metal of main groups I to VIII or of transition groups II to VIII of the Periodic Table of the Elements including boron, X is as defined in formula (I), where two X groups may be replaced by one oxo group, and a corresponds to the valence of the element.

Suitable examples of hydrolytically removable X groups of the above formulae are hydrogen, halogen (F, Cl, Br or I, in particular Cl or Br), alkoxy (e.g. $C_{1-6}$-alkoxy, for example methoxy, ethoxy, n-propoxy, i-propoxy and n-, i-, sec- or tert-butoxy), aryloxy (preferably $C_{6-10}$-aryloxy, for example phenoxy), alkaryloxy, for example benzoyloxy, acyloxy (e.g. $C_{1-6}$-acyloxy, preferably $C_{1-4}$-acyloxy, for example acetoxy or propionyloxy) and alkylcarbonyl (e.g. $C_{2-7}$-alkylcarbonyl such as acetyl). Likewise suitable are $NH_2$, mono- or dialkyl-, -aryl- and/or -aralkyl-substituted amino, examples of the alkyl, aryl and/or aryalkyl radicals being specified below for R, amido such as benzamido or aldoxime or ketoxime groups. Two or three X groups may also be joined to one another, for example in the case of Si-polyol complexes with glycol, glycerol or pyrocatechol. The groups mentioned may optionally contain substituents such as halogen, hydroxyl, alkoxy, amino or epoxy.

Preferred hydrolytically removable X radicals are halogen, alkoxy groups and acyloxy groups. Particularly preferred hydrolytically removable radicals are $C_{2-4}$-alkoxy groups, especially ethoxy.

The hydrolytically non-removable R radicals of the formula (I) are, for example, alkyl (e.g. $C_{1-20}$-alkyl, in particular $C_{1-4}$-alkyl, such as methyl, ethyl, n-propyl, i-propyl, n-butyl, i-butyl, sec-butyl and tert-butyl), alkenyl (e.g. $C_{2-20}$-alkenyl, especially $C_{2-4}$-alkenyl, such as vinyl, 1-propenyl, 2-propenyl and butenyl), alkynyl (e.g. $C_{2-20}$-alkynyl, especially $C_{2-4}$-alkynyl, such as ethynyl or propargyl), aryl (especially $C_{6-10}$-aryl, such as phenyl and naphthyl) and corresponding aralkyl and alkaryl groups such as tolyl and benzyl, and cyclic $C_{3-12}$-alkyl and -alkenyl groups such as cyclopropyl, cyclopentyl and cyclohexyl.

The R radicals may have customary substituents which may be functional groups, by virtue of which cross-linking of the condensate via organic groups is also possible if required. Customary substituents are, for example, halogen (e.g. chlorine), epoxide (e.g. glycidyl or glycidyloxy), hydroxyl, ether, ester, amino, monoalkylamino, dialkylamino, optionally substituted anilino, amide, carboxyl, alkenyl, alkynyl, acryloyl, acryloyloxy, methacryloyl, methacryloyloxy, mercapto, cyano, alkoxy, isocyanato, aldehyde, keto, alkylcarbonyl, acid anhydride and phosphoric acid. These substituents are bonded to the silicon atom via divalent bridging groups, especially alkylene, alkenylene or arylene bridging groups which may be interrupted by oxygen or NH groups. The bridging groups contain, for example, from 1 to 18, preferably from 1 to 8 and in particular from 1 to 6 carbon atoms. The divalent bridging groups mentioned derive, for example, from the abovementioned monovalent alkyl, alkenyl or aryl radicals. Of course, the R radical may also have more than one functional group.

Preferred examples of hydrolytically non-removable R radicals with functional groups, by virtue of which crosslinking is possible, are a glycidyl- or a glycidyloxy-($C_{1-20}$)-alkylene radical such as β-glycidyloxyethyl, γ-glycidyloxypropyl, δ-glycidyloxybutyl, ε-glycidyloxypentyl, ω-glycidyloxyhexyl and 2-(3,4-epoxycyclohexyl)ethyl, a (meth)acryloyloxy-($C_{1-6}$)-alkylene radical, e.g. (meth)acryloyloxymethyl, (meth)-acryloyloxyethyl, (meth)acryloyloxypropyl or (meth)acryloyloxybutyl, and a 3-isocyanatopropyl radical. Particularly preferred radicals are γ-glycidyloxypropyl and (meth)acryloyloxypropyl. Here, (meth)acryloyl represents acryloyl and methacryloyl.

Especially for a use in which the process is used for a change in the wetting behavior of the geological formations, silanes of the formula (I) which have at least one fluorine atom on the R radical may be used. This embodiment is illustrated below. The fluorosilanes may also be used for the consolidation. The fluorosilanes of the formula (IV) described below may be used as silanes of the formula (I) alone or preferably with further non-fluorine-containing silanes of the formula (I).

Preferred R radicals are radicals without substituents or functional groups, especially alkyl groups, preferably having from 1 to 4 carbon atoms, especially, methyl and ethyl, and also aryl radicals such as phenyl. Examples of organosilanes of the general formula (I) are compounds of the following formulae, particular preference being given to the alkylsilanes and especially methyltriethoxysilane:

$CH_3$—$SiCl_3$, $CH_3$—$Si(OC_2H_5)_3$, $C_2H_5$—$SiCl_3$, $C_2H_5$—$Si(OC_2H_5)_3$, $C_3H_7$—$Si(OC_2H_5)_3$, $C_6H_5$—$Si(OC_2H_5)_3$, $(C_2H_5O)_3$—$Si$—$C_3H_6$—$Cl$, $(CH_3)_2SiCl_2$, $(CH_3)_2Si(OC_2H_5)_2$, $(CH_3)_2Si(OH)_2$, $(C_6H_5)_2SiCl_2$, $(C_6H_5)_2Si(OC_2H_5)_2$, $(i-C_3H_7)_3SiOH$, $CH_2$=$CH$—$Si(OOCCH_3)_3$, $CH_2$=$CH$—$SiCl_3$, $CH_2$=$CH$—$Si(OC_2H_5)_3$, $CH_2$=$CHSi(OC_2H_5)_3$, $CH_2$=$CH$—$Si(OC_2H_4OCH_3)_3$, $CH_2$=$CH$—$CH_2$—$Si(OC_2H_5)_3$, $CH_2$=$CH$—$CH_2$—$Si(OC_2H_5)_3$, $CH_2$=$CH$—$CH_2Si(OOCCH_3)_3$, $CH_2$=$C(CH_3)COO$—$C_3H_7$—$Si(OC_2H_5)_3$, $n$-$C_6H_{13}$—$CH_2CH_2$—$Si(OC_2H_5)_3$, $n$-$C_8H_{17}$—$CH_2$—$CH_2$—$Si(OC_2H_5)_3$,

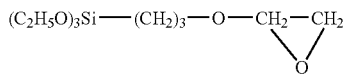

The examples of the optionally hydrolyzable silanes of the general formula (II) are $Si(OCH_3)_4$, $Si(OC_2H_5)_4$, $Si(O-n-$ or $i-C_3H_7)_4$, $Si(OC_4H_9)_4$, $SiCl_4$, $HSiCl_3$, $Si(OOCCH_3)_4$. Among these hydrolyzable silanes, particular preference is given to tetraethoxysilane.

The silanes can be prepared by known methods; cf. W. Noll, "Chemie und Technologie der Silicone" [Chemistry and Technology of the Silicones], Verlag Chemie GmbH, Weinheim/Bergstraße (1968).

In the metal compound of the general formula (III)

$$MX_a \quad (III),$$

M is a metal of main groups I to VIII or of transition groups II to VIII of the Periodic Table of the Elements including boron, X is as defined in formula (I), where two X groups may be replaced by one oxo group, and a corresponds to the valence of the element.

M is different from Si, Boron is also included here in the metals. Examples of such metal compounds are compounds of the glass- or ceramic-forming elements, especially compounds of at least one element M from main groups III to V and/or transition groups II to IV of the Periodic Table of the Elements. They are preferably hydrolyzable compounds of Al, B, Sn, Ti, Zr, V or Zn, especially those of Al, Ti or Zr, or mixtures of two or more of these elements. It is likewise possible to use, for example, hydrolyzable compounds of elements of main groups I and II of the Periodic Table (e.g. Na, K, Ca and Mg) and of transition groups V to VIII of the Periodic Table (e.g. Mn, Cr, Fe and Ni). It is also possible to use hydrolyzable compounds of the lanthanoids such as Ce. Preference is given to metal compounds of the elements B, Ti, Zr and Al, particular preference being given to Ti.

Preferred metal compounds are, for example, the alkoxides of B, Al, Zr and especially Ti. Suitable hydrolyzable metal compounds are, for example, $Al(OCH_3)_3$, $Al(OC_2H_5)_3$, $Al(O-n-C_3H_7)_3$, $Al(O-i-C_3H_7)_3$, $Al(O-n-C_4H_9)_3$, $Al(O-sec.-C_4H_9)_3$, $AlCl_3$, $AlCl(OH)_2$, $Al(OC_2H_4OC_4H_9)_3$, $TiCl_4$, $Ti(OC_2H_5)_4$, $Ti(O-n-C_3H_7)_4$, $Ti(O-i-C_3H_7)_4$, $Ti(OC_4H_9)_4$, $Ti(2-ethylhexoxy)_4$, $ZrCl_4$, $Zr(OC_2H_5)_4$, $Zr(O-n-C_3H_7)_4$, $Zr(O-i-C_3H_7)_4$, $Zr(OC_4H_9)_4$, $ZrOCl_2$, $Zr(2-ethylhexoxy)_4$, and also Zr compounds which have complexing radicals, for example β-diketone and (meth)acryloyl radicals, sodium ethoxide, potassium acetate, boric acid, $BCl_3$, $B(OCH_3)_3$, $B(OC_2H_5)_3$, $SnCl_4$, $Sn(OCH_3)_4$, $Sn(OC_2H_5)_4$, $VOCl_3$ and $VO(OCH_3)_3$.

In a particularly preferred embodiment, the consolidant is prepared using an alkylsilane such as methyltriethoxysilane (MTEOS), an arylsilane such as phenyltriethoxysilane and an orthosilicic ester such as tetraethoxysilane (TEOS) and a metal compound of the formula (III), particular preference being given to the use of a metal compound of B, Al, Zr and especially Ti.

To prepare the hydrolyzate or precondensate, preference is given to using at least 50 mol %, more preferably at least 70 mol % and in particular at least 80 mol % of organosilanes of the formula (I) with at least one hydrolytically non-removable group. The rest are hydrolyzable compounds, especially the metal compounds of the formula (III) and optionally the hydrolyzable silanes of the formula (II) which do not have any hydrolytically non-removable groups.

The molar ratio of silicon compounds of the formulae (I) and (II) used to metal compounds of the formula (III) used is in the range from 8000:1 to 8:1, particularly good hydrolysis stability being achieved in the range from 1600:1 to 160:1 and more preferably from 1600:1 to 16:1.

For the calculation of the molar fractions or ratios which are specified above, the starting materials for the compounds are in each case the monomeric compounds. When, as explained above, the starting materials used are already precondensed compounds (dimers, etc.), it is necessary to convert to the corresponding monomers.

The hydrolyzates or precondensates of the consolidant are obtained from the hydrolyzable silanes and the hydrolyzable metal compounds by hydrolysis and condensation. Hydrolyzates or precondensates are understood to mean in particular hydrolyzed or at least partly condensed compounds of the hydrolyzable starting compounds. Instead of the hydrolyzable monomer compounds, it is also possible to use already precondensed compounds. Such oligomers which are preferably soluble in the reaction medium may, for example, be straight-chain or cyclic low molecular weight partial condensates (e.g. polyorganosiloxanes) with a degree of condensation of, for example, from about 2 to 100, in particular from about 2 to 6.

The hydrolyzates or precondensates are preferably obtained by hydrolysis and condensation of the hydrolyzable starting compounds by the sol-gel process. In the sol-gel process, the hydrolyzable compounds are hydrolyzed with water, optionally in the presence of acidic or basic catalysts, and usually at least partly condensed. Preference is given to effecting the hydrolysis and condensation in the presence of acidic condensation catalysts (e.g. hydrochloric acid, phosphoric acid or formic acid) at a pH of preferably from 1 to 3. The sol which forms may be adjusted to the viscosity desired for the consolidant by virtue of suitable parameters, for example degree of condensation, solvent or pH.

Further details of the sol-gel process are described, for example, in C. J. Brinker, G. W. Scherer: "Sol-Gel Science—The Physics and Sol-Gel-Processing", Academic Press, Boston, San Diego, New York, Sydney (1990).

For the hydrolysis and condensation, it is possible to use stoichiometric amounts of water, but also smaller or greater amounts. Preference is given to employing a substoichiometric amount of water based on the hydrolyzable groups present. The amount of water used for the hydrolysis and condensation of the hydrolyzable compounds is preferably from 0.1 to 0.9 mol and more preferably from 0.25 to 0.75 mol of water per mole of the hydrolyzable groups present. Particularly good results are often achieved with less than 0.7 mol of water, in particular from 0.55 to 0.65 mol of water, per mole of hydrolyzable groups present.

Before use, the consolidant may be activated by addition of a further amount of water. The consolidant used in accordance with the invention is present in particular in particle-free form as a solution or emulsion.

It may contain conventional additives and especially solvents such as water, alcohols, preferably lower aliphatic alcohols ($C_1$-$C_8$-alcohols), such as methanol, ethanol, 1-propanol, -isopropanol and 1-butanol, ketones, preferably lower dialkyl ketones, such as acetone and methyl-isobutyl ketone, ethers, preferably lower dialkyl ethers, such as diethyl ether, or mono-ethers of diols, such as ethylene glycol or propylene glycol, with $C_1$-$C_8$-alcohols, amides such as dimethyl-formamide, tetrahydrofuran, dioxane, sulfoxides, sulfones or butylglycol and mixtures thereof. Preference is given to using water and alcohols. It is also possible to use high-boiling solvents, for example polyethers such as triethylene glycol, diethylene glycol diethyl ether and tetraethylene glycol dimethyl ether. In some cases, other solvents also find use, for example light paraffins (petroleum ether, alkanes and cycloalkanes), aromatics, heteroaromatics and halogenated hydrocarbons. It is also possible to use dicarboxylic esters such as dimethyl succinate, dimethyl adipate, dimethyl glutarate and mixtures thereof, and also the cyclic carboxylic esters, for example propylene carbonate and glycerol carbonate.

Other conventional additives are, for example, dyes, pigments, viscosity regulators and surfactants. For the preparation of emulsions of the consolidant, it is possible to employ the stabilizing emulsifiers customary in silicone emulsions, for example Tween® 80 and Brij® 30.

To produce consolidated geological formations, the consolidant is infiltrated or injected into the geological formation.

The consolidation (curing) is effected under elevated temperature and elevated pressure based on standard conditions, i.e. the pressure is greater than 1 bar and the temperature is higher than 20° C. Preference is given to curing the consolidant in accordance with the geological boundary conditions in the reservoir in which it is used, generally at temperatures above 40° C. and pressures of at least 40 bar. Depending upon the formation depth, temperatures up to 160° C. and pressures up to 500 bar may occur.

It is known that thermal curing of consolidants, under ambient pressure is quite unproblematic. The continuous removal of the solvent and of the water reaction product from the mixture of binder sol and material to be consolidated results consecutively in a progressing condensation reaction. In the further thermal curing process, the consolidant is compacted on the material to be consolidated.

However, the properties of consolidated materials also depend upon the conditions under which they are produced. In general, improved performance of the consolidated materials is obtained when they are produced under approximately the same conditions under which they are to be used. For applications of consolidated materials at elevated pressures and temperatures, it is therefore desirable also to carry out the production under approximately the same conditions. However, this is problematic for the prior art consolidants, since in the course of curing of prior art consolidants at elevated pressure and elevated temperature, i.e. under hydrothermal conditions, solvents and reaction products remain in the system and merely enable a shift in the equilibrium. However, the equilibrium position under these conditions does not afford consolidated materials.

It has been found that, surprisingly, the equilibrium position is changed by the use of metal compounds of the formula (III) according to the invention, so that setting of the consolidant used became possible under hydrothermal conditions (elevated pressure and elevated temperature). In this way, it is possible to obtain consolidated geological formations under hydrothermal conditions, the consolidated formations having good binding stabilities with sufficient flexibility.

The curing of the consolidant under hydrothermal conditions may also be promoted by addition of anhydrides to the consolidant. With the aid of the anhydrides, condensation products such as water and ethanol can be scavenged. The anhydrides are preferably anhydrides of organic acids or mixtures of these anhydrides. Examples are acetic anhydride, methylnadic anhydride, phthalic anhydride, succinic anhydride and mixtures thereof.

In the case of addition of anhydrides, preference is given to using, for example, cyclic carbonic esters such as propylene carbonate, or carboxylic esters such as dimethyl glutarate, dimethyl adipate and dimethyl succinate, or dimethyl dicarboxylate mixtures of the esters mentioned as a solvent. In general, it is possible for this purpose to fully or partly exchange the suitable solvent for the solvent used or formed in the preparation of the consolidant. In addition to the solvent exchange, it is also possible to use a preferred solvent as early as in preparation of the consolidant.

The curing of geological formations to be consolidated is thus possible under hydrothermal conditions.

Since a compaction operation of the gelled consolidant is prevented under hydrothermal conditions, the consolidant gel frequently seals the pores in large volumes. This can preferably be prevented or eliminated by passing a solid or liquid medium into the material which is to be consolidated and is mixed with the consolidant, which can adjust the porosity in the desired manner. The introduction is effected especially before or during the curing operation over a certain period.

Parameters for the through-pumping, such as duration, time, amount or through-flow rate of the liquid or gaseous phase can be selected by those skilled in the art in a suitable manner directly, in order to establish the desired porosity. The introduction can be effected, for example, before or after partial curing, in which case full curing is effected after and/or during the introduction. To introduce a liquid or gaseous medium, it is possible, for example, to pump in an inert solvent or gas, for example $N_2$, $CO_2$ or air, which clears the pore volumes by purging and removes reaction products. As examples of solvents for the liquid medium, reference may be made to those listed above. The liquid or gaseous medium may optionally comprise catalysts and/or gas-releasing components or be laden with them.

The curing of the consolidant can optionally be promoted by supplying condensation catalysts which bring about crosslinking of the inorganically cross-linkable SiOH groups or metal-OH groups to form an inorganic network. Condensation catalysts suitable for this purpose are, for example, bases or acids, but also fluoride ions or alkoxides. These may be added, for example, to the consolidant shortly before the mixing with the geological formation. In a preferred embodiment, the above-described gaseous or liquid media which are passed through the geological formation are laden with the catalyst. The catalyst is preferably volatile, gaseous or evaporable. The catalyst may comprise dissolved substances, for example zirconium oxychloride, and be metered to the binder in the form of a gradient.

The consolidated geological formations are preferably porous.

To simulate the process under hydrothermal conditions, preference is given to using a so-called "displacement cell" used customarily in the oil industry. In this cell, a cylindrical specimen which comprises the sample to be consolidated, via the outer surface made of lead, is subjected to a confinement pressure which simulates the geological formation pressure (e.g. 70 bar) and compacted. Via the end surfaces of the sample cylinder, the media are introduced and discharged against an opposing pressure of 50 bar. For thermal curing, the cell is temperature-controlled. The resulting porosity and permeability attain more than 80% of the original values with strengths up to 1.6 MPa.

Owing to its chemical constitution, the inventive consolidant enables rapid and effective consolidation of oil- or water-bearing, usually sand-containing, geological formations. In this connection, the use of phenylsilane alkoxides has been found to be particularly useful. The reason for this is suspected to be that these compounds, owing to the steric hindrance of the phenyl group and the electronic effects, do not have rapidly reacting OH groups, which bond particularly efficiently with the surface of inorganic materials.

It has also been found that such systems are particularly suitable for oil-contaminated particles, since the consolidant can undermine and remove the oil layer on the inorganic surface, as a result of which bridge bonds between adjacent granule particles are enabled. The latter has the additional effect that such systems are also suitable for removing fats and oils from inorganic surfaces and, for example, for improving the discharge of such substances from the interstices of sand beds or else geological formations. It is thus possible to realize binding processes in oil-containing sands and to clean such sands of oil.

For this purpose, the hydrolyzate or precondensate of the consolidant may comprise a component which is oleophobic and hydrophobic, as a result of which the wetting behavior of geological formations can be altered. This constitutes an additional preferred embodiment. The oleophobic and hydrophobic component can preferably be bonded to the hydrolyzate or precondensate of the consolidant or be present therein, and becomes a constituent of the hydrolyzate or condensate in both cases.

The oleophobic and hydrophobic component of the hydrolyzate or precondensate is preferably formed from one or more silanes of the general formula (IV)

$$Rf(R)_b SiX_{(3-b)} \quad\quad (IV)$$

in which X and R are each as defined in formula (I), Rf is a non-hydrolyzable group which has from 1 to 30 fluorine atoms bonded to aliphatic carbon atoms, and b is 0, 1 or 2. These compounds are also referred to below as fluorosilanes.

The fluorosilane may be used, for example, as the silane of the formula (I) for preparing the hydrolyzate or precondensate. It may be used as the sole silane of the formula (I), but it is preferably used together with other silanes of the formula (I) to prepare the hydrolyzate or precondensate. In a preferred embodiment, a hydrolyzate or precondensate is prepared first without fluorosilanes according to the above remarks and then mixed with one or more fluorosilanes of the formula (IV). In this case, the fluorosilanes can add onto or bind onto the already formed hydrolyzate or condensate. In both cases, the hydrolyzates or precondensates obtained from the fluorosilane are a constituent of the hydrolyzate or precondensate, the enrichment of the fluorine components in the outer region being enhanced in the latter case. In the case of use of the silane of the formula (IV), it is taken into account for the determination of the molar ratio of silicon compounds to metal compounds used.

In the formula (IV), Rf is preferably a fluorinated alkyl group, for example having from 3 to 20 carbon atoms, and examples are $CF_3CH_2CH_2$, $C_2F_5CH_2CH_2$, $n\text{-}C_6F_{13}CH_2CH_2$, $i\text{-}C_3F_7OCH_2CH_2CH_2$, $n\text{-}C_8F_{17}CH_2CH_2$ and $n\text{-}C_{10}F_{21}$—$CH_2CH_2$. A preferred example of Rf is 1H,1H,2H,2H-perfluorooctyl.

Examples of usable fluorosilanes are $CF_3CH_2CH_2SiCl_2(CH_3)$, $CF_3CH_2CH_2SiCl(CH_3)_2$, $CF_3CH_2CH_2Si(CH_3)(OCH_3)_2$, $C_2F_5$—$CH_2CH_2$—$SiZ_3$, $n\text{-}C_6F_{13}$—$CH_2CH_2SiZ_3$, $n\text{-}C_8F_{17}CH_2CH_2$—$SiZ_3$, $n\text{-}C_{10}F_{21}$—$CH_2CH_2$—$SiZ_3$, in which $Z=OCH_3$, $OC_2H_5$ or Cl; $i\text{-}C_3F_7O$—$CH_2CH_2CH_2$—$SiCl_2(CH_3)$, $n\text{-}C_6F_{13}$—$CH_2CH_2$—$Si(OCH_2CH_3)_2$, $n\text{-}C_6F_{13}$—$CH_2CH_2$—$SiCl_2(CH_3)$ and $n\text{-}C_6F_{13}$—$CH_2CH_2$—$SiCl(CH_3)_2$.

The use of oleophobic and hydrophobic components in the consolidant can change the wetting behavior of the geological formations. As a result, the consolidant can bring about both a consolidation and a change in the wetting behavior. In the case of latter applications, it is, however, also possible for the consolidation function to play a minor or even no role. In these cases, it acts instead as a wetting-regulating agent, but the designation as a consolidant is retained.

In processes which serve to change the wetting behavior, it may be appropriate to use the consolidant in high dilution, for example with a solids content of not more than 10% by weight.

In order to enable a change in the wetting behavior, the consolidant may be infiltrated or injected into the geological formation.

The inventive consolidation process can be used advantageously in gas or mineral oil extraction, especially for consolidating geological sand formations in oil- or water-bearing reservoirs, for example in the borehole region.

The change in the wetting behavior of geological formations by the process according to the invention can be utilized, for example, for increasing the yield of oil-bearing formations. Another use is the change in the wetting behavior of a toxicologically contaminated geological formation, such as industrial land, in order to enable regeneration of the formation by facilitated cleaning. The system is also suitable for the cleaning of oil-contaminated sands.

It is possible to obtain porous formations, for example of sand, bonded with the consolidant, in which the porosity is generated or maintained by blowing in a medium such as air which has optionally been admixed with volatile catalysts. Water- or mineral oil-"filled" formations already possess porosity in the narrower sense before binding with the consolidant. When an attempt is made, after the introduction of the consolidant which is yet to be cured, to cure it by introducing liquid catalysts, curing does occur but the pores are blocked by the cured consolidant.

The example which follows illustrates the invention.

EXAMPLE

Influence on the wetting behavior of oil-bearing formations to increase the yield of formations a) Consolidant MTTi$_{0.1}$P$_3$ 06

26.2 g of MTEOS, 7.64 g of TEOS and 0.087 g of titanium tetraisopropoxide were mixed and reacted under vigorous, stirring with 12.63 g of deionized water and 0.088 ml of concentrated hydrochloric acid (37%). After the changeover point, the reaction mixture exceeded a temperature maximum of 62° C. After cooling of the reaction mixture to 47° C., a further silane mixture which consists of 26.45 g of phenyltriethoxysilane, 6.54 g of MTEOS and 7.64 g of TEOS was added to the mixture and stirred further for another 5 minutes. After standing overnight, the binder is suitable for consolidating formation sand under hydrothermal conditions. Depending on the requirements, the pH may be adjusted within the range between pH 0 and 7.

b) Treatment of the Formation 250 g of MTTi$_{0.1}$P3 06 according to Example 1 are admixed with 7.5 g of 1H,1H,2H,2H-perfluorooctyltriethoxysilane (FTS) and stirred at RT overnight. For use as a wetting-regulating consolidant for porous, oil-bearing formations, 100 g of the above mixture are diluted with 220 g of diethylene glycol monoethyl ether. After infiltration into porous sandstones, the wetting behavior is determined as neutral with the aid of an imbibition test. To determine the hydrolysis stability, coated sandstone is subjected to hydrothermal treatment in synthetic salt solution at 70 bar and 120° C. for 16 h. After drying, the imbibition test is carried out. The wetting behavior remains unchanged and neutral.

What is claimed is:

1. A process for a consolidation which is hydrolytically stable under hydrothermal conditions or for a change of a wetting behavior of a geological formation which is at least one of porous and particulate, wherein the process comprises introducing into the geological formation a consolidant and curing the introduced consolidant under elevated pressure and elevated temperature, the consolidant comprising at least one of a hydrolyzate and a precondensate of (a) at least one organosilane of formula (I)

$$R_nSiX_{4-n} \qquad (I)$$

in which the radicals R are the same or different and are each hydrolytically non-removable groups, the radicals X are the same or different and are each hydroxyl groups or hydrolytically removable groups and n is 1, 2 or 3, (b) optionally, at least one hydrolyzable silane of formula (II)

$$SiX_4 \qquad (II)$$

in which the radicals X are each as defined above, and (c) at least one metal compound of formula (III)

$$MX_a \qquad (III)$$

in which M is a metal of main groups I to VIII or of transition groups II to VIII of the Periodic Table of the Elements including boron, X is as defined for formula (I), with the proviso that two radicals X may be replaced by one oxo group, and a corresponds to a valence of M, where a molar ratio of compounds of formulae (I) and (II) to compound(s) of formula (III) is from 8000:1 to 8:1 and being present in a particle-free form before being introduced into the geological formation.

2. The process of claim 1, wherein the process comprises at least one of infiltrating and injecting the consolidant into the geological formation.

3. The process of claim 1, wherein the consolidant is cured at a temperature of at least 40° C. and a pressure of at least 40 bar.

4. The process of claim 1, wherein the compound of formula (III) comprises at least one of B, Al, Zr and Ti.

5. The process of claim 4, wherein the compound of formula (III) comprises at least Ti.

6. The process claim 1, wherein at least one of before and during curing of the consolidant, at least one of a liquid and gaseous medium is passed for a certain period through the geological formation which is to be consolidated and comes into contact with the consolidant in order to adjust a porosity.

7. The process of claim 6, wherein the at least one of a liquid and gaseous medium comprises air.

8. The process of claim 6, wherein the at least one of a liquid and gaseous medium is laden with a catalyst which is at least one of volatile, gaseous and evaporable.

9. The process of claim 8, wherein the catalyst comprises at least one of an acid and a base.

10. The process of claim 1, wherein the consolidant comprises at least one of a hydrolyzate and a precondensate of (a1) an alkylsilane, (a2) an arylsilane, (b) an orthosilicic ester and (c) a metal alkoxylate.

11. The process of claim 1, wherein the consolidant is prepared by a sol-gel process with a substoichiometric amount of water based on hydrolyzable groups present.

12. The process of claim 1, wherein the consolidant is present as at least one of a solution and an emulsion before being introduced into the geological formation.

13. The process of claim 1, wherein the consolidant further comprises a solvent which comprises at least one of a cyclic carbonic ester and a carboxylic ester.

14. The process of claim 1, wherein the geological formation comprises at least one of sand and sandstone or is a sand formation.

15. The process of claim 14, wherein the geological formation comprises an oil- or water-bearing geological formation.

16. The process of claim 1, wherein the at least one of a hydrolyzate and a precondensate comprises at least one component which is oleophobic and hydrophobic to change the wetting behavior of the geological formation.

17. The process of claim 16, wherein the at least one component is at least one of bonded to the precondensate and present therein.

18. The process of claim 16, wherein the at least one component is obtained by using for the preparation of the at least one of a hydrolyzate or a precondensate one or more silanes of formula (IV)

$$Rf(R)_bSiX_{(3-b)} \qquad (IV)$$

in which the radicals X and R are each as defined in formula (I), Rf is a non-hydrolyzable group which comprises from 1 to 30 fluorine atoms bonded to aliphatic carbon atoms, and b is 0, 1 or 2, the silane(s) of formula (IV) being taken into account for determining the molar ratio of compounds of formulae (I) and (II) and compound(s) of formula (III).

19. The process of claim 18, wherein the one or more silanes of the formula (IV) are used as the only silane(s) of formula (I).

20. The process of claim 18, wherein the one or more silanes of the formula (IV) are used as the silanes of formula (I) in combination with at least one non-fluorine-containing silane of formula (I).

21. The process of claim 18, wherein the one or more silanes of formula (IV) are added to a hydrolyzate or precondensate of the consolidant, said hydrolyzate or precondensate already having been prepared with at least one non-fluorine-containing silane of formula (I), in order to obtain bonding of the one or more silanes of formula (IV) to the hydrolyzate or precondensate.

22. The process of claim 16, wherein a wetting behavior of a geological formation utilized for the extraction of oil is changed in order to increase a productivity of mineral oil extraction.

23. The process of claim 1, wherein the process comprises a consolidation of a loose formation.

24. The process of claim 23, wherein the loose formation comprises an oil-containing loose formation.

25. The process of claim 16, wherein a wetting behavior of at least one of a toxicologically contaminated formation and an oil-contaminated geological formation is changed to facilitate a cleaning of the formation.

26. A process for a consolidation which is hydrolytically stable under hydrothermal conditions or for a change of a wetting behavior of a geological formation which is at least one of porous and particulate, wherein the process comprises at least one of infiltrating and injecting into the geological formation a consolidant and curing the introduced consolidant at a temperature of at least 40° C. and a pressure of at least 40 bar, the consolidant comprising at least one of a hydrolyzate and a precondensate of (a) at least one organosilane of formula (I)

$$RnSiX_{4-n} \quad (I)$$

in which the radicals R are the same or different and are each hydrolytically non-removable groups, the radicals X are the same or different and are each hydroxyl groups or hydrolytically removable groups and n is 1, 2 or 3, (b) optionally, at least one hydrolyzable silane of formula (II)

$$SiX_4 \quad (II)$$

in which the radicals X are each as defined above, and (c) at least one metal compound of formula (III)

$$MX_a \quad (III)$$

in which M is a metal of main groups I to VIII or of transition groups II to VIII of the Periodic Table of the Elements and comprises at least one B, Al, Zr and Ti, X is as defined for formula (I), with the proviso that two radicals X may be replaced by one oxo group, and a corresponds to a valence of M, where a molar ratio of compounds of formulae (I) and (II) to compound(s) formula (III) is from 1600:1 to 16:1 and being present in a particle-free form before being introduced into the geological formation.

27. The process of claim 26, wherein the molar ratio is from 1600:1 to 160:1.

28. The process of claim 26, wherein the consolidant comprises at least one of a hydrolyzate and a precondensate of (a1) an alkylsilane, (a2) an arylsilane, (b) an orthosilicic ester and (c) a metal alkoxylate.

29. The process of claim 26, wherein the at least one of a hydrolyzate and a precondensate comprises at least one component which is oleophobic and hydrophobic to change the wetting behavior of the geological formation.

30. The process of claim 29, wherein the at least one component is obtained by using for the preparation of the at least one of a hydrolyzate or a precondensate one or more silanes of formula (IV)

$$Rf(R)_b SiX_{(3-b)} \quad (IV)$$

in which the radicals X and R are each as defined in formula (I), Rf is a non-hydrolyzable group which comprises from 1 to 30 fluorine atoms bonded to aliphatic carbon atoms, and b is 0, 1 or 2, the silane(s) of formula (IV) being taken into account for determining the molar ratio of compounds of formulae (I) and (II) and compound(s) of formula (III).

31. A geological formation which has been treated by the process of claim 1.

32. The formation of claim 31, wherein the formation comprises a loose formation.

33. The formation of claim 31, wherein the formation comprises at least one of a toxicologically contaminated formation and an oil-contaminated geological formation.

* * * * *